United States Patent
Moosaei et al.

(10) Patent No.: US 10,481,609 B2
(45) Date of Patent: Nov. 19, 2019

(54) PARKING-LOT-NAVIGATION SYSTEM AND METHOD

(71) Applicant: Ford Global Technologies, LLC, Dearborn, MI (US)

(72) Inventors: Maryam Moosaei, Mishawaka, IN (US); Jinesh J Jain, Palo Alto, CA (US); Harpreetsingh Banvait, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 291 days.

(21) Appl. No.: 15/373,845

(22) Filed: Dec. 9, 2016

(65) Prior Publication Data
US 2018/0164830 A1 Jun. 14, 2018

(51) Int. Cl.
| | | |
|---|---|---|
| *G05D 1/02* | (2006.01) | |
| *B60W 30/06* | (2006.01) | |
| *G05D 1/00* | (2006.01) | |
| *G06K 9/00* | (2006.01) | |

(Continued)

(52) U.S. Cl.
CPC ........... *G05D 1/0246* (2013.01); *B60W 30/06* (2013.01); *G05D 1/0088* (2013.01); *G06K 9/00798* (2013.01); *G06K 9/00812* (2013.01); *G08G 1/142* (2013.01); *G08G 1/146* (2013.01); *B60W 2420/52* (2013.01); *B60W 2420/54* (2013.01);

(Continued)

(58) Field of Classification Search
None
See application file for complete search history.

(56) References Cited

U.S. PATENT DOCUMENTS

| | | | |
|---|---|---|---|
| 8,060,271 B2 | 11/2011 | Dolgov | |
| 8,521,366 B2 | 8/2013 | Schneider | |
| 9,541,409 B2 * | 1/2017 | Kojo | ...................... G01C 21/34 |

(Continued)

FOREIGN PATENT DOCUMENTS

| | | |
|---|---|---|
| CN | 105825203 | 8/2016 |
| EP | 2963631 A1 | 1/2016 |

(Continued)

OTHER PUBLICATIONS

Lee Soomok; Seo Seung-Woo—Available parking slot re cognition based on slot context analysis, JET Intelligent Transport Sys, Nov. 1, 2016, vol. 10, No. 9, doi:10.1049/iet-its.

*Primary Examiner* — Navid Ziaeianmehdizadeh
(74) *Attorney, Agent, or Firm* — David R. Steven; Stevens Law Group

(57) ABSTRACT

A system and method for assisted or autonomous parking of a vehicle is disclosed. The method may begin when the vehicle approaches a feeder lane within a parking lot. At that point, a computer system may decide whether the vehicle should enter the feeder lane. The computer system may use at least one of machine learning, computer vision, and range measurements to determining whether a condition precedent for entering the feeder lane exists. The condition precedent may include an in-bound arrow on the feeder lane or parking lines and/or a parked vehicle adjacent the feeder lane defining a departure angle less than or equal to ninety degrees. If the condition precedent exists, the vehicle may enter the feeder lane. If the condition precedent does not exist, the vehicle may move on to another feeder lane.

20 Claims, 8 Drawing Sheets

(51) Int. Cl.
*G08G 1/14* (2006.01)
*G08G 1/16* (2006.01)

(52) U.S. Cl.
CPC . *B60W 2710/20* (2013.01); *G05D 2201/0213* (2013.01); *G08G 1/168* (2013.01)

(56) References Cited

U.S. PATENT DOCUMENTS

| | | | |
|---|---|---|---|
| 9,694,813 B2* | 7/2017 | Toyoda | B60W 10/04 |
| 2008/0136673 A1* | 6/2008 | Jung | B62D 15/0285 |
| | | | 340/932.2 |
| 2009/0207045 A1* | 8/2009 | Jung | G06K 9/00798 |
| | | | 340/932.2 |
| 2010/0219010 A1* | 9/2010 | Kadowaki | B62D 15/0285 |
| | | | 180/204 |
| 2013/0152493 A1* | 6/2013 | Karisch | E04H 6/426 |
| | | | 52/174 |
| 2013/0162829 A1* | 6/2013 | Kadowaki | B62D 15/028 |
| | | | 348/148 |
| 2013/0211699 A1* | 8/2013 | Scharmann | G01C 21/32 |
| | | | 701/117 |
| 2013/0265429 A1* | 10/2013 | Yoon | G08G 1/14 |
| | | | 348/148 |
| 2014/0003709 A1 | 1/2014 | Ranganathan | |
| 2014/0297107 A1* | 10/2014 | Wagner | B60W 30/06 |
| | | | 701/36 |
| 2014/0320318 A1* | 10/2014 | Victor | G08G 1/142 |
| | | | 340/932.2 |
| 2014/0324310 A1* | 10/2014 | Kobayashi | B62D 15/0285 |
| | | | 701/70 |
| 2014/0350853 A1* | 11/2014 | Proux | G01C 21/34 |
| | | | 701/533 |
| 2015/0248131 A1* | 9/2015 | Fairfield | G05D 1/0044 |
| | | | 701/2 |
| 2015/0321555 A1 | 11/2015 | Fukata | |
| 2015/0371095 A1* | 12/2015 | Hartmann | G06K 9/00791 |
| | | | 348/148 |
| 2016/0003636 A1* | 1/2016 | Ng-Thow-Hing | H04N 7/188 |
| | | | 701/26 |
| 2016/0017634 A1 | 1/2016 | Parker | |
| 2016/0148450 A1* | 5/2016 | Ohshima | B60R 25/2018 |
| | | | 340/5.61 |
| 2016/0217688 A1* | 7/2016 | Jeschke | G06K 9/00798 |
| 2016/0307052 A1* | 10/2016 | Han | G06K 9/00798 |
| 2016/0318551 A1* | 11/2016 | Terkes | B62D 15/028 |
| 2017/0015312 A1* | 1/2017 | Latotzki | B60W 30/06 |
| 2017/0169314 A1* | 6/2017 | Dijkman | G06K 9/4628 |
| 2017/0174227 A1* | 6/2017 | Tatourian | G06K 9/00805 |
| 2017/0206434 A1* | 7/2017 | Nariyambut Murali | |
| | | | G06K 9/628 |
| 2017/0355307 A1* | 12/2017 | Ha | G08G 1/143 |
| 2018/0086381 A1* | 3/2018 | Hoffman, Jr. | B62D 15/0285 |
| 2018/0093662 A1* | 4/2018 | Kim | B60K 35/00 |
| 2018/0093663 A1* | 4/2018 | Kim | G08G 1/165 |
| 2018/0093664 A1* | 4/2018 | Kim | B62D 15/027 |
| 2018/0099661 A1* | 4/2018 | Bae | B60R 1/00 |
| 2018/0301031 A1* | 10/2018 | Naamani | G06K 9/00771 |

FOREIGN PATENT DOCUMENTS

| | | |
|---|---|---|
| EP | 2974944 | 1/2016 |
| EP | 2982572 A2 | 2/2016 |
| EP | 2766244 B1 | 6/2016 |
| WO | WO2014/041209 | 3/2014 |
| WO | WO-2014041209 A1 | 3/2014 |
| WO | WO2015/186294 | 12/2015 |

* cited by examiner

PARKING-LOT-NAVIGATION SYSTEM AND METHOD

BACKGROUND

Field of the Invention

This invention relates to vehicular systems and more particularly to systems and methods for determining whether a vehicle should enter a currently presented feeder lane within a parking lot.

Background of the Invention

Parking is an unavoidable component of vehicle use. Parking often involves finding an available space in a parking lot. Accordingly, what are needed are computerized systems that safely assist a vehicle in navigating a parking lot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
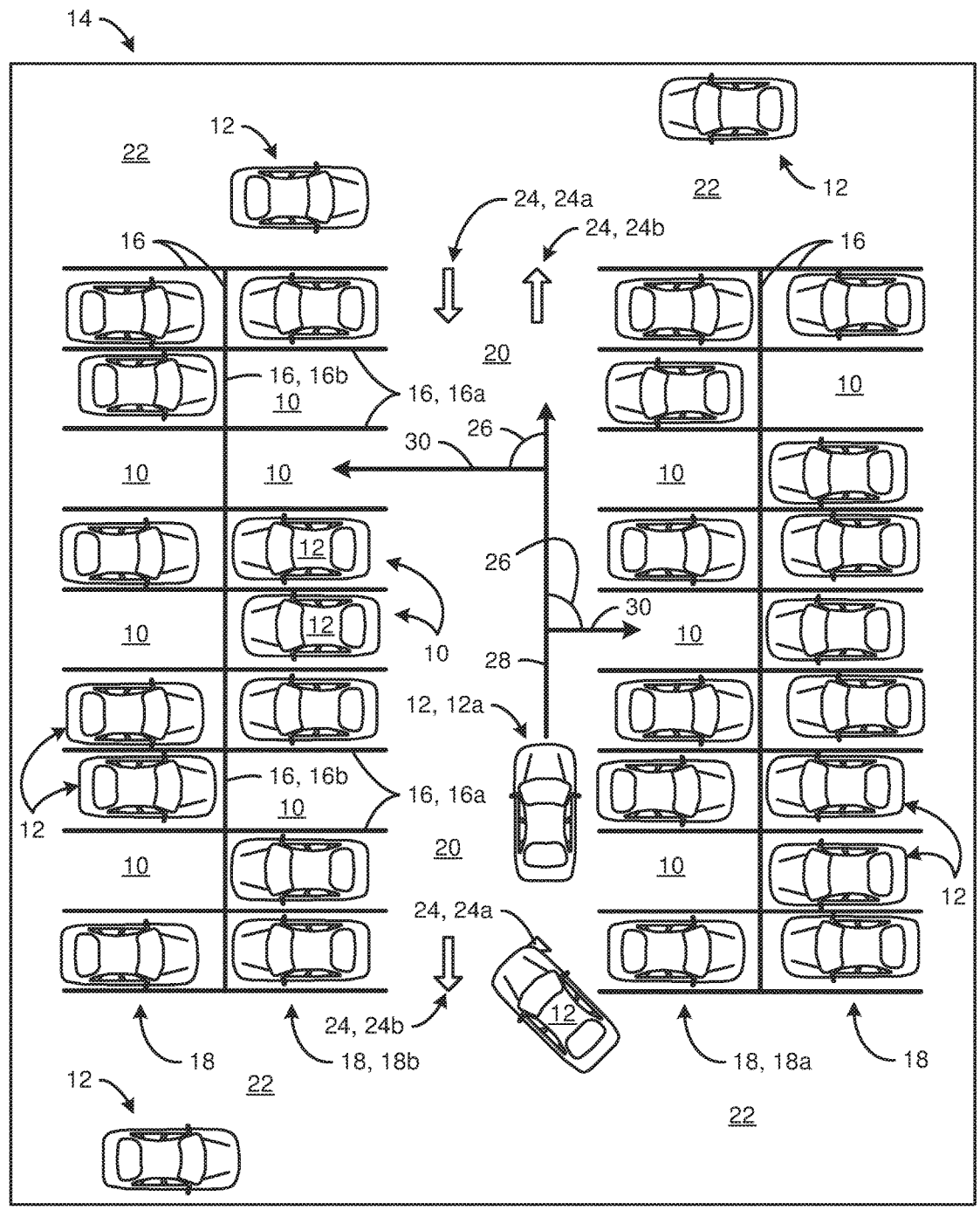
FIG. 1 is a schematic diagram illustrating a top view of a portion of a parking lot wherein the parking spaces are orthogonal with respect to the feeder lane and the vehicles drive on the right side.

Referring to FIG. 1, a parking space 10 may be a geographical area where it is appropriate to park a vehicle 12. A parking lot 14 may be a geographical area comprising multiple parking spaces 10. In selected embodiments, the multiple parking spaces 10 of a parking lot 14 may be arranged in some orderly manner. For example, within a parking lot 14, lines 16 (e.g., lines 16 that are painted or otherwise adhered to a surface of a parking lot 14) may delineate or define the boundaries of one or more parking spaces 10. Such lines 16 may include side lines 16a, a stop line 16b, or the like or a combination thereof. In selected embodiments, a vehicle 12 parking within a parking space 10 may be positioned between two adjacent side lines 16a and have an end (e.g., front or rear bumper) that is close to, but not extending over, a stop line 16b.

In certain embodiments, parking spaces 10 of a parking lot 14 may be arranged in one or more rows 18. Moreover, a parking lot 14 may include one or more feeder lanes 20. A feeder lane 20 may be a lane from which parking spaces 10 are directly accessible. Typically, each feeder lane 20 within a parking lot 14 may extend adjacent to and generally track at least one row 18 of parking spaces 10. Accordingly, a vehicle 12 traveling down a feeder lane 20 may be able to directly access (e.g., turn directly into) the parking spaces 10 of a row 18 adjacent the feeder lane 20.

In selected embodiments, a vehicle 12 may exit a street and enter a parking lot 14 in an effort to find a parking space 10 that is unoccupied and where it would be appropriate to park. Such entering may comprise entering a feeder lane 20 of the parking lot. Thereafter, the vehicle 12 may travel on one feeder lane 20 after another until an empty parking space 10 is located or the search for an empty parking space 10 in the parking lot 14 is abandoned. Alternatively, such entering may comprise entering a thoroughfare 22 of the parking lot 14.

A thoroughfare 22 may be a lane within a parking lot 14 from which no parking spaces 10 are directly accessible. A thoroughfare 22 within a parking lot 14 may simply be a lane that allows one or more vehicles 12 to reach one or more feeder lanes 20. Accordingly, when a vehicle 12 enters a parking lot 14, the vehicle 12 may first travel on a thoroughfare 22 to reach a feeder lane 20. The vehicle 12 may then travel on the feeder lane 20 to reach a parking space 10 that is unoccupied. Thus, the vehicle 12 may travel on one more thoroughfares 22, one or more feeder lanes 20, or a combination thereof until an empty parking space 10 is located or the search for an empty parking space 10 in the parking lot 14 is abandoned.

In certain embodiments, one or more arrows 24 may be applied to one or more feeder lanes 20. For example, one or more arrows 24 may be painted or otherwise adhered to a surface of a parking lot 14 that forms a feeder lane 20. Such arrows 24 may provide an indication of which direction or directions of travel are appropriate for the feeder lane 20. That is, it would be appropriate for a vehicle 12 to travel on the feeder lane 20 in the direction or directions indicated by such arrows 24.

Arrows 24 may be positioned proximate the ends of one or more feeder lanes 20. Accordingly, such arrows 24 may indicate whether a corresponding end is an entrance into the feeder lane 20, an exit from the feeder lane 20, or both an entrance and an exit for the feeder lane 20. For example, an in-bound arrow 24a (e.g., an arrow located proximate an end of a feeder lane 20 and pointed into the feeder lane 20) may be an indicator that the end functions as an entrance to the feeder lane 20. An out-bound arrow 24b (e.g., an arrow located proximate an end of a feeder lane 20 and pointed out of the feeder lane 20) may be an indicator that the end functions as an exit to the feeder lane 20. When both in-bound and outbound arrows 24 are located proximate an end of a feeder lane 20, it may be an indicator that the end functions as both an entrance and an exit.

In selected embodiments, a row 18 of parking spaces 10 and an adjacent feeder lane 20 may combine to define an angle of departure 26. An angle of departure 26 may be a measure of the change of direction necessary for a vehicle 12 traveling down the feeder lane 20 in a first direction 28 to appropriately enter one or more of the parking spaces 10 in a second direction 30.

For example, in the illustrated embodiment, a feeder lane 20 is adjacent a first row 18a of parking spaces 10 on one side and adjacent a second row 18b of parking spaces 10 on the other side. The feeder lane 20 and the adjacent rows 18a, 18b are straight. Moreover, the parking spaces 10 within both rows 18a, 18b are orthogonal to the feeder lane 20 (e.g., the vehicles 12 already parked in both rows 18a, 18b are orthogonal to a vehicle 12a traveling down the feeder lane 20). Accordingly, in the illustrated embodiments, for the given direction of travel 28, the angle of departure 26 on both the left and the right are about ninety degrees.

Figure 2:
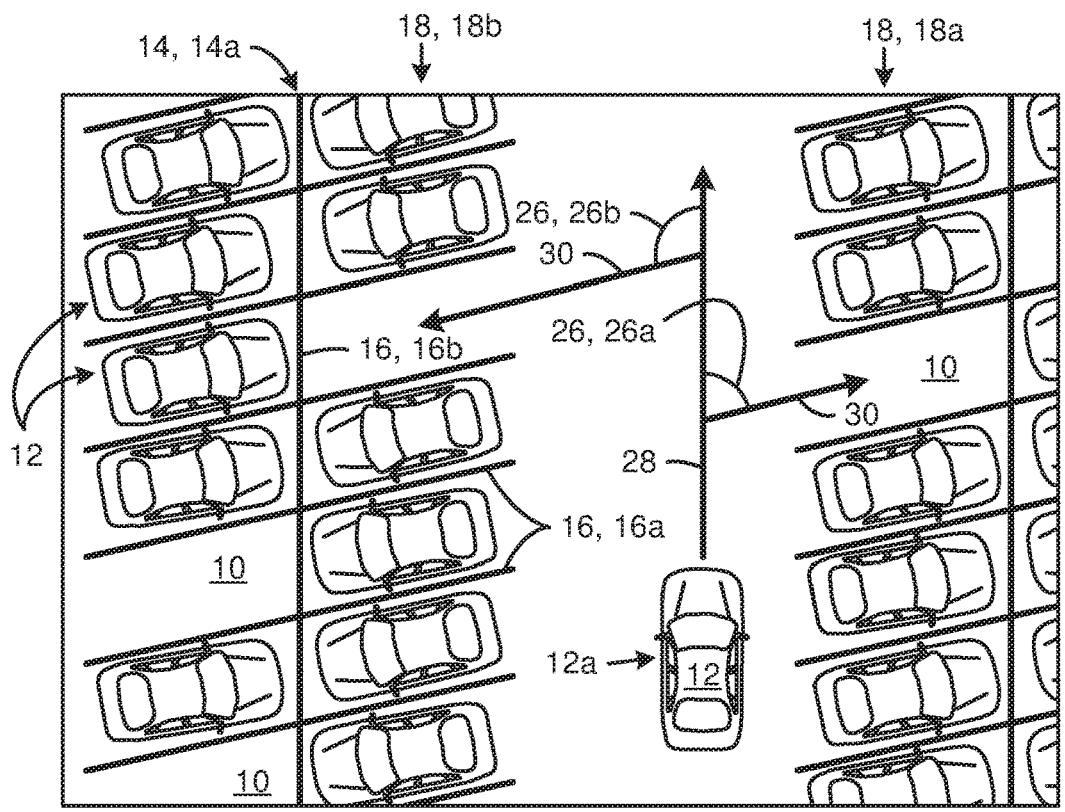
FIG. 2 is a schematic diagram illustrating a top view of a portion of a parking lot wherein the parking spaces are not orthogonal with respect to the feeder lane and the vehicles drive on the right side.
Figure 3:
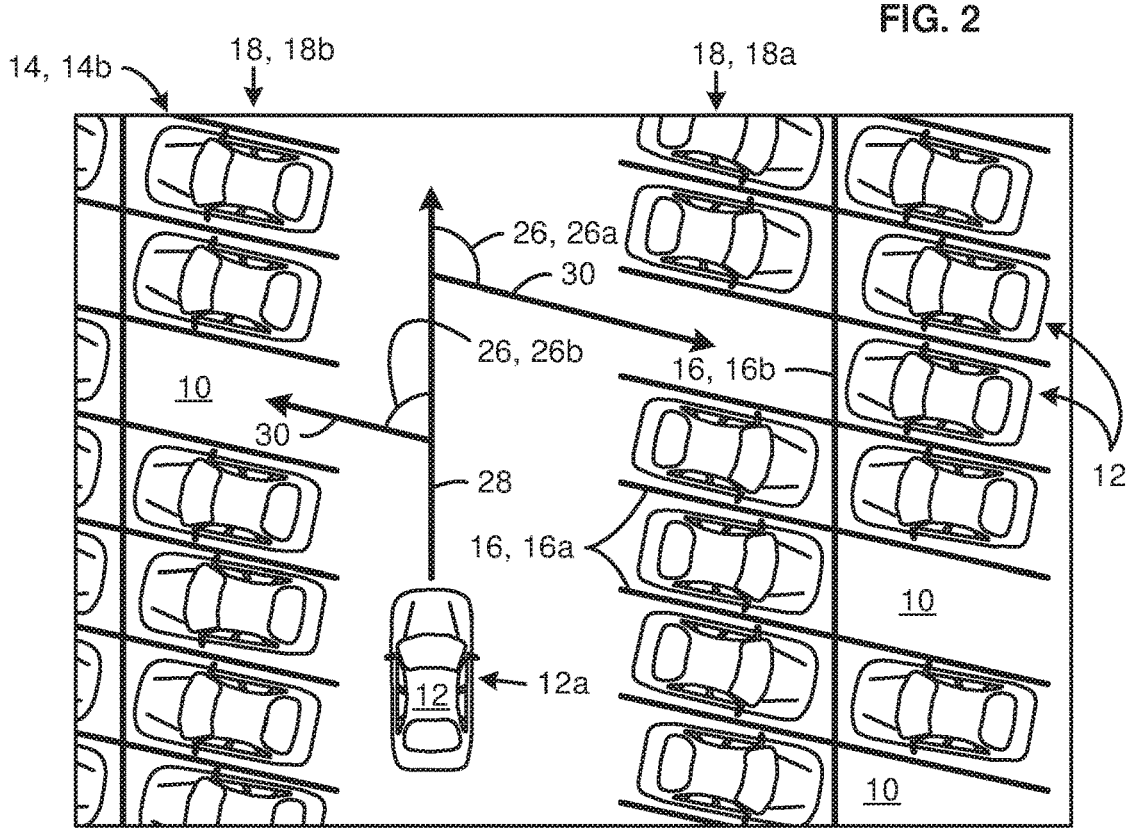
FIG. 3 is a schematic diagram illustrating a top view of a portion of a parking lot wherein the parking spaces are not orthogonal with respect to the feeder lane and the vehicles drive on the left side.

Referring to FIGS. 2 and 3, in other embodiments, in other parking lots 14, or with different (e.g., opposite) directions of travel 28, the angle of departure 26 may be something other than ninety degrees. For example, in the illustrated embodiments, a feeder lane 20 is adjacent a first row 18a of parking spaces 10 on one side and adjacent a second row 18b of parking spaces 10 on the other side. The feeder lane 20 and the adjacent rows 18a, 18b are straight. However, the parking spaces 10 within both rows 18a, 18b are not orthogonal to the feeder lane 20 (e.g., the vehicles 12 already parked in both rows 18a, 18b are not orthogonal to a vehicle 12a traveling down the feeder lane 20). Accordingly, in the illustrated embodiments, for the given direction of travel 28, the angle of departure 26a on the right (e.g., into a parking space 10 in the first row 18a) is less than ninety degrees. The angle of departure 26b on the left (e.g., into a parking space 10 in the second row 18b) is greater than ninety degrees.

In selected embodiments, when parking within a parking lot 14, a turn corresponding to an angle of departure 26 of ninety degrees or less may be relatively easy to make. Conversely, a turn corresponding to an angle of departure 26 of more than ninety degrees may be relatively difficult to make. Accordingly, it may be considered appropriate to park in a parking space 10 corresponding to an angle of departure 26 of less than or equal to ninety degrees and inappropriate to park in a parking space 10 corresponding to an angle of departure 26 of greater than ninety degrees.

In certain embodiments, if one or more parking spaces 10 are angled (e.g., oriented at something other than zero or ninety degrees) with respect to a corresponding feeder lane 20, the angle of departure 26 may be less than or equal to ninety degrees at least on the side on which it is conventional to drive a vehicle 10. For example, the parking lot 14a shown in FIG. 2 may be located in a country where it is conventional to drive on the right side of the road. Accordingly, in that parking lot 14a, if one or more parking spaces 10 are angled with respect to a corresponding feeder lane 20, the angle of departure 26 for the parking spaces 10 on at least the right side may be less than or equal to ninety degrees. Conversely, the parking lot 14b shown in FIG. 3 may be located in a country where it is conventional to drive on the left side of the road. Accordingly, in that parking lot 14b, if one or more parking spaces 10 are angled with respect to a corresponding feeder lane 20, the angle of departure 26 for the parking spaces 10 on at least the left side may be less than or equal to ninety degrees.

If both angles of departure 26a, 26b (e.g., the angles of departure on the right and on the left) are greater than ninety degrees, it may be an indication that the feeder lane 20 is a one directional lane and that the corresponding vehicle 12 (e.g., the vehicle 12 for which both angles of departure 26a, 26b are or would be greater than ninety degrees) is or would be traveling in the wrong direction down the feeder lane 20. If both angles of departure 26a, 26b are less than ninety degrees, it may be an indication that the feeder lane 20 is a one directional lane and that the corresponding vehicle 12 is or would be traveling in the correct direction down the feeder lane 20.

Figure 4:
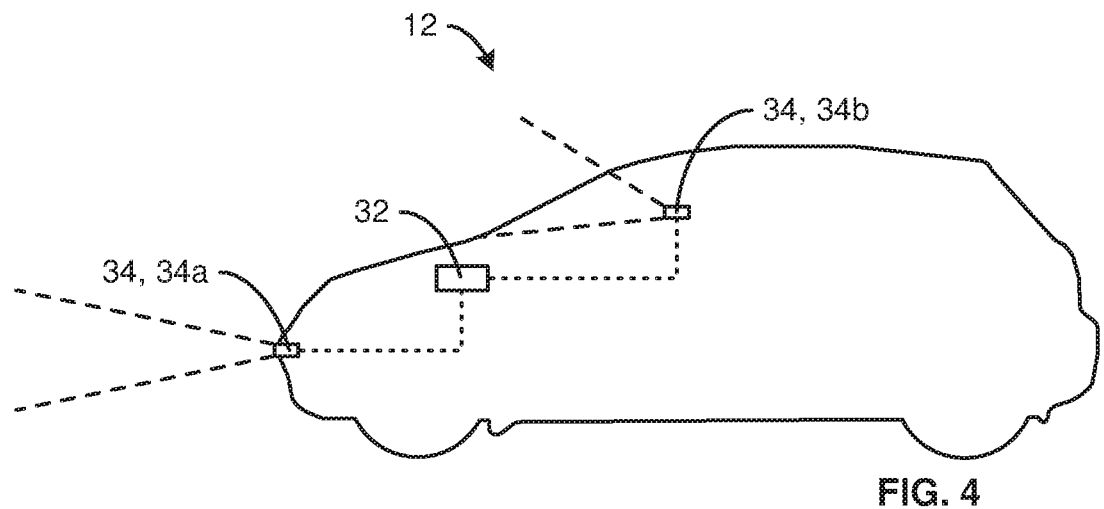
FIG. 4 is a schematic diagram illustrating one embodiment of a vehicle carrying on-board a system for assisting the vehicle in navigating a parking lot in accordance with the present invention.
Figure 5:
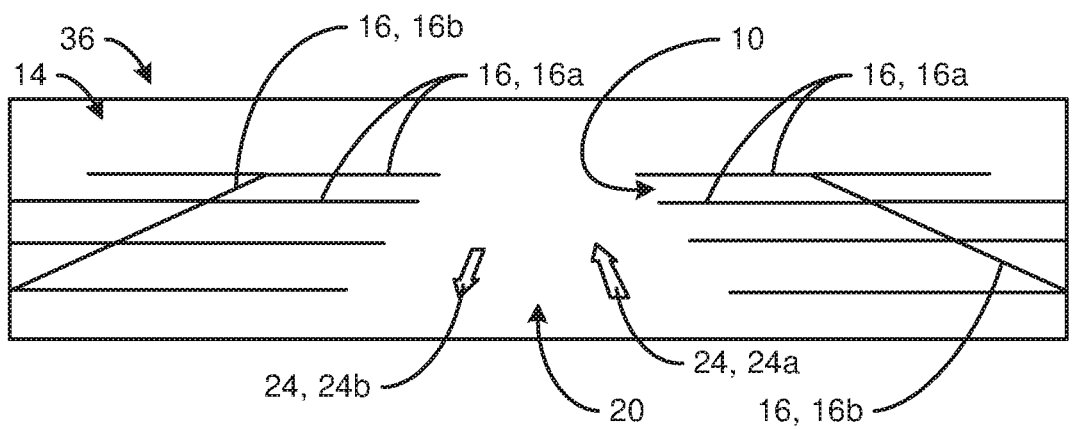
FIG. 5 is a schematic diagram illustrating an exemplary image that may be captured by a forward-looking camera carried on-board a vehicle.

Referring to FIGS. 4 and 5, parking lots 14 and the various components and/or configurations thereof must be properly interpreted for a vehicle 12 to be safely parked. This reality creates significant challenges for drivers and for autonomous driving systems. For example, if a driver is distracted, he or she may not properly detect and/or respond to an arrow 24 and may drive his or her vehicle 12 the wrong way down a feeder lane 20. Similarly, since parking is an extremely common operation, autonomous driving systems may be required to park a corresponding vehicle 12 in parking lots 14 of various configurations.

To overcome these challenges, a vehicle 12 in accordance with the present invention may carry on-board a system 32 tasked with detecting, measuring, and/or classifying various components and/or configurations of one or more parking lots 14. A system 32 in accordance with the present invention may use the outputs of one or more on-board sensors 34 as the basis for such detection, measurement, and/or classification. The sensors 34 included within a vehicle 12 may take any suitable form. For example, one or more sensors 34 may comprise cameras, lidar devices, radar devices, ultrasonic transducers, or the like or a combination or subcombination thereof.

In selected embodiments, a system 32 in accordance with the present invention may control one or more functions of a vehicle 12. For example, a system 32 may control the operation of one or more warning systems of a vehicle 12. Accordingly, should the data from one or more sensors 34 indicate that a vehicle 12 is traveling or attempting to travel the wrong way down a feeder lane 20, a system 32 may instruct one or more warning systems to issue one or more warnings (e.g., flash a light, sound an alarm, vibrate a steering wheel, or the like). Alternative, or in addition thereto, a system 32 may control the operation of one or more core systems of a vehicle 12. Accordingly, should the data from one or more sensors 34 indicate that a vehicle 12 is approaching a one-way feeder lane 20 from the wrong direction, a system 32 may instruct the vehicle 12 to avoid the feeder lane 20, move on to another feeder lane 20, or the like or a combination thereof.

In certain embodiments, one or more sensors 34 in accordance with the present invention may be forward-facing or forward-looking sensors 34a (e.g., sensors directed to an area ahead of a vehicle 12), point-of-view sensors 34b (e.g., sensors capturing a driver's point of view through a windshield), side-view sensors, rear-view sensors, or the like or a combination or sub-combination thereof.

Sensor data (e.g., video) captured by one or more sensors 34 may be processed by a system 32 as individual images 36 or frames 36. For example, computer-vision analysis and/or deep learning may be applied by a system 32 to all or selected portions of one or more images 36 captured by one or more sensors 34. The system 32 may take such images 36 and/or selected portions of such images 36 into consideration as it determines which parking configuration is represented therein (e.g., as it determines whether it would be appropriate to enter a particular feeder lane 20). Accordingly, a system 32 may control one or more functions of a vehicle 12 in accordance with computer-vision analysis, classifications made by an artificial neural network, or the like or a combination thereof.

In certain embodiments, decisions made by a system 32 may occur in real time with the capturing of the sensor data upon which the decisions are based. For example, an artificial neural network may quantify the correspondence of particular sensor data (e.g., image data) to one or more classes within a very short period of time after the capture of that particular sensor data by one or more sensors 34. In selected embodiments, that very short period of time may be about one second or less.

Figure 6:
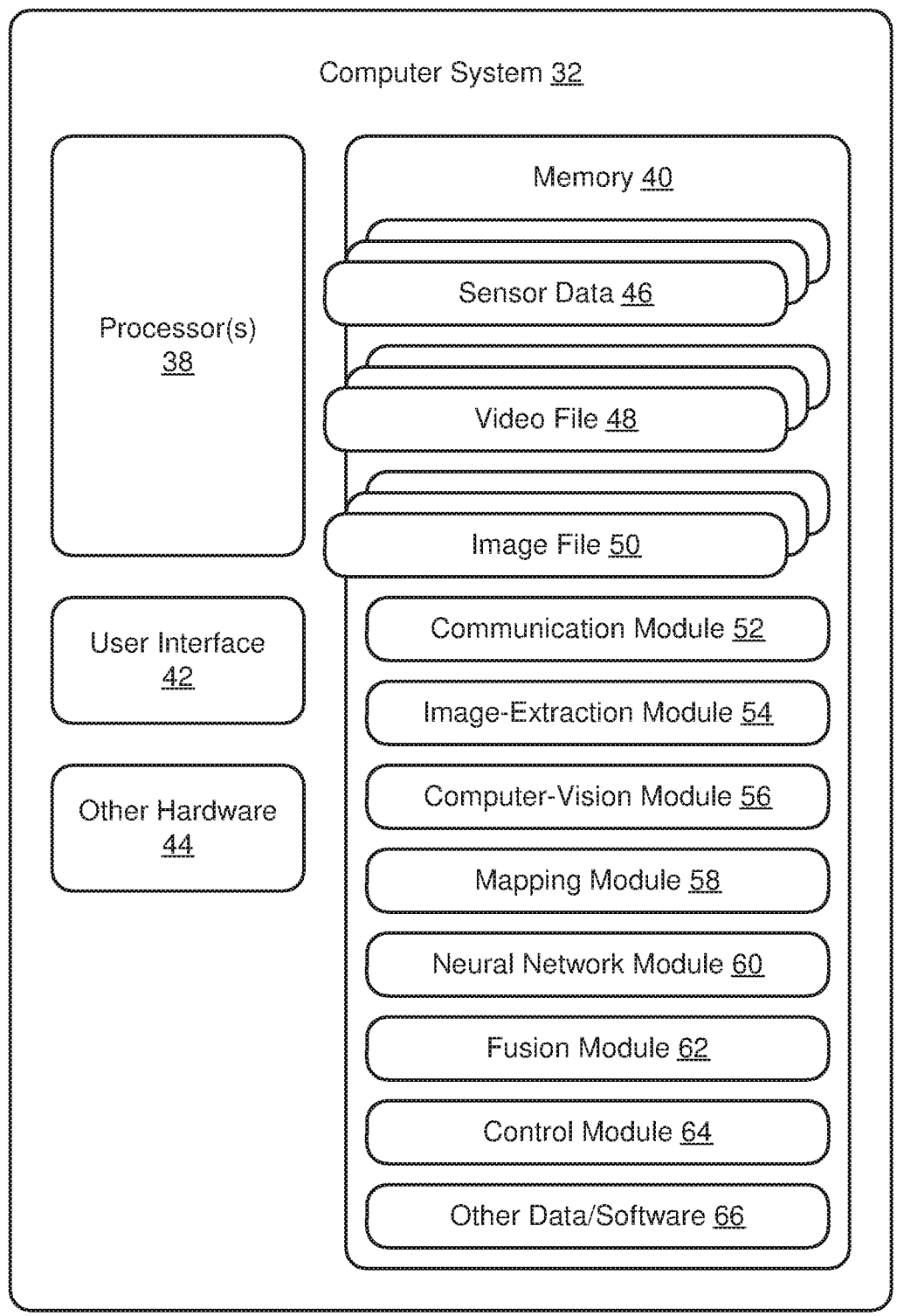
FIG. 6 is a schematic block diagram illustrating one embodiment of a system for assisting a vehicle in navigating a parking lot in accordance with the present invention.

Referring to FIG. 6, a system 32 in accordance with the present invention may generate or collect information characterizing one or more parking configurations using computer vision, three-dimensional mapping, deep learning, or a combination thereof. A system 32 may accomplish this in any suitable manner. For example, a system 32 may be embodied as hardware, software, or some combination thereof.

In selected embodiments, a system 32 may include computer hardware and computer software. The computer hardware of a system 32 may include one or more processors 38, memory 40, one or more user interfaces 42, other hardware 44, or the like or a combination or sub-combination thereof. In certain embodiments, all or some subset of this computer hardware may be hardware already included as part of a vehicle 12. That is, all or some portion of the computer hardware may be multipurpose and perform tasks that are already associated with the operation of the vehicle 12. Alternatively, a system 32 in accordance with the present invention may be dedicated exclusively to detecting, classifying, and/or responding to various parking configurations.

The memory 40 of a system 32 in accordance with the present invention may be operably connected to the one or more processors 38 and store the computer software. This may enable the one or more processors 38 to execute the computer software. Thus, a system 32 may augment the functionality or features of a vehicle 12 by adding and/or modifying software, adding additional hardware to the vehicle 12, or a combination thereof.

A user interface 42 of a system 32 may enable an engineer, technician, driver, or the like to interact with, run, customize, or control various aspects of a system 32. A user interface 42 of a system 32 may include one or more buttons, keypads, keyboards, touch screens, pointing devices, or the like or a combination or sub-combination thereof. Alternatively, or in addition thereto, a user interface 42 may comprise one or more communication ports (e.g., plug in ports, wireless communication ports, etc.) through which one or more external computers or devices may communicate with a system 32 or one or more components thereof.

In selected embodiments, the memory 40 of a system 32 may store (at least temporality) sensor data 46 (e.g., one or more segments of signal output by one or more sensors 34 carried on-board a vehicle 12), video 48 (e.g., one or more video files 48) collected or captured by one or more sensors 34 carried on-board a vehicle 12, one or more images files 50 containing, defining, or corresponding to one or more images captured by one or more sensors 34 or extracted from video collected or captured by one or more sensors 34, or the like or a combination or sub-combination thereof.

Additionally, the memory 40 may store one or more software modules. For example, the memory 40 may store a communication module 52, image-extraction module 54, computer-vision module 56, mapping module 58, neural network module 60, fusion module 62, control module 64, other data or software 66, or the like or a combination or sub-combinations thereof. Alternatively, one or more of the communication module 52, image-extraction module 54, computer-vision module 56, mapping module 58, neural network module 60, fusion module 62, and control module 64 may be embodied as hardware or comprise hardware components. Thus, while FIG. 6 shows the communication module 52, image-extraction module 54, computer-vision module 56, mapping module 58, neural network module 60, fusion module 62, and control module 64 as being software-only modules that are stored in memory 40, in actuality, one or more of these modules 52, 54, 56, 58, 60, 62, 64 may comprise hardware, software, or a combination thereof.

A communication module 52 may enable data such as one or more segments of sensor data 46, video files 48, image files 50, software components (e.g., one or more modules 52, 54, 56, 58, 60, 62, 64 or updates thereto), information characterizing a parking lot 14, classifications (e.g., classification information output by an artificial neural network of a system 32), or the like or combinations of sub-combinations thereof to be passed into or out of a system 32 in accordance with the present invention. For example, a communication module 52 forming part of a system 32 carried on-board a vehicle 12 may enable the system 32 to receive an update to its computer-vision module 56, mapping module 58, neural network module 60, or the like. Accordingly, improvements developed off-board a vehicle 12 may be brought on-board as desired or necessary.

Alternatively, or in addition thereto, a communication module 52 may enable certain processes associated with a system 32 to be performed off-board the corresponding vehicle 12 (e.g., in the cloud). For example, a communication module 52 may pass data such as one or more segments of sensor data 46, video files 48, or image files 50 to a remote computer system (e.g., a computer system off-board the vehicle 12). That remote computer system may include or perform certain functions associated with a computer-vision module 56, mapping module 58, neural network module 60, fusion module 62, or the like. Thus, work associated with a system 32 in accordance with the present invention may be divided between on-board and off-board components as desired or necessary.

An image-extraction module 54 may extract one or more images 36 from video captured by one or more sensors 34. For example, an image-extraction module 34 may extract one or more images 36 from a video file 48 that is stored in memory 40, video that is being output by a sensor 34, or the like. In selected embodiments, an image-extraction module 54 may store one or more images 36 that are extracted thereby as images files 50 in memory 40.

A computer-vision module 56 may employ computer-vision techniques to extract information characterizing a parking lot 14 from one or more images 36 captured by one or more sensors 34. For example, a computer-vision module 56 may detect within one or more images 36 the presence of one or more parked vehicles 12, lines 16 defining one or more parking spaces 10, or the like. Moreover, a computer-vision module 56 may determine the orientation of one or more parked vehicles 12, lines 16 defining one or more parking spaces 10, or the like with respect to a vehicle 12 (e.g., the vehicle 12 utilizing the computer-vision module 56), a feeder lane 20, a thoroughfare 22, or the like. Based on the work of a computer-vision module 56, a system 32 may detect a feeder lane 20, determine whether it would be appropriate to enter the feeder lane 20, detect an empty parking space 10, steer the vehicle 12 into an empty parking space 10, or the like or a combination or sub-combination thereof.

In selected embodiments, a computer-vision module 56 may determine which portions of one or more images 36 should be processed by a neural network module 60. For example, a computer-vision module 56 may identify and crop one or more portions of an image 36 that are more likely to contain an arrow 24. Such portions may then be passed to a neural network module 60 to be classified.

A mapping module 58 may use range measurements to generate a three-dimensional map of an area proximate a corresponding vehicle 12. For example, in selected embodiments, a mapping module 58 may use range measurements corresponding to one or more lidar, radar, ultrasonic devices 34 to determine the orientation of one or more parked vehicles 12 with respect to each other, with respect to the vehicle 12 utilizing the mapping module 58, or the like. Based on the work of a mapping module 58, a system 32 may detect a feeder lane 20, determine whether it would be appropriate to enter the feeder lane 20, detect an empty parking space 10, steer the vehicle 12 into an empty parking space 10, or the like or a combination or sub-combination thereof.

A neural network module 60 may be, include, or support an artificial neural network programmed to perform or apply deep learning. The deep learning performed or applied by an artificial neural network may use one or more algorithms to model high-level abstractions in data corresponding to one or more portions of one or more images 36 collected by the one or more sensors 34 connected to a system 32 in accordance with the present invention. In selected embodiments, this may be accomplished by using multiple processing layers comprising multiple non-linear transformations.

For example, an artificial neural network corresponding to a neural network module 60 may comprise feed-forward computational graphs with input nodes, hidden layers and output nodes. For classifications that involve images, pixel-values of an input image forming part of the classification may be assigned to input nodes, and then be fed through the network, passing a number of non-linear transformations. At the end of the computation, the output node may yield a value that corresponds to the class inferred by the neural network.

In order for an artificial neural network corresponding to a neural network module 60 to be able to distinguish between different classes, it needs to be trained based on examples. Accordingly, to create an artificial neural network that is able to classify a plurality of different parking lot configurations, a large collection of example images (e.g., hundreds to thousands for each type) having known (e.g., labeled) characteristics must be used as training data. Thus, using backpropagation, an artificial neural network may be trained.

An artificial neural network corresponding to a neural network module 60 may be trained while operating within or on the hardware a non-production system 32. For example, an artificial neural network may be trained on an off-board system 32 in a computer laboratory, a non-production system 32 carried on-board a test vehicle 12 specifically for the purposes of training, or the like. Once trained, an artificial neural network may be "cloned" or otherwise copied onto or imported within a production system 32 forming part of a production vehicle 12.

When trained, an artificial neural network corresponding to a neural network module 60 may receive one or more inputs (e.g., one or more images 36 captured by one or more sensors 34, cropped portions of one or more images 36 captured by one or more sensors 34, or the like) and classify those inputs as having a particular numeric affinity (e.g., percentage "score") for each class for which the artificial neural network was trained. Accordingly, if an artificial neural network were trained on ten different classes, then for one or more inputs, the artificial neural network may output ten numeric scores. Each such score may be indicative of the affinity of the one or more inputs (or of the physical reality reflected by the one or more inputs) to a different class.

In a decisive or clear classification, the one or more inputs may show a strong affinity to one class and weak affinity to all other classes. In an indecisive or unclear classification, the one or more inputs may show no preferential affinity to any particular class. For example, there may be a "top" score for a particular class, but that score may be close to other scores for other classes.

Accordingly, in selected embodiments, a neural network module 60 may apply one or more threshold comparisons or tests to determine whether any particular classification is sufficiently decisive or clear so as to be acted or relied upon (e.g., whether the classification is sufficiently decisive or clear so as to merit some change to the functioning of a vehicle 12). For example, a neural network module 60 may test a classification to see if the separation between a top score and all other scores meets or satisfies a certain separation threshold.

An artificial neural network in accordance with the present invention may be trained to recognize (e.g., produce affinity scores for) a certain, predetermined set of classes. The number of classes within such a set may vary between embodiments. In certain embodiments, the number of classes may be one greater than the types of parking lot configurations a corresponding vehicle 12 is lightly to encounter. For example, if an artificial neural network were only concerned with arrows 24 and a corresponding vehicle 12 were only likely to encounter four types of arrows 24 (e.g., a left-to-right arrow 24, a right-to-left arrow, a front-to-back arrow 24, and a back-to-front arrow), the number of classes may be five and include a not-an-arrow class, a left-to-right-arrow class, a right-to-left-arrow class, a front-to-back-arrow class, and a back-to-front-arrow class.

Alternatively, an artificial neural network may be trained to recognize more than just arrows 24 or parking configurations (e.g., locations and/or orientations of parked vehicles 12, locations and/or orientations of lines 16, or combinations thereof) other than arrows 24. For example, in selected embodiments, an artificial neural network in accordance with the present invention may be trained to recognize feeder lanes 20 of various configurations including: feeder lanes 20 that extend from a thoroughfare 22 on the right; feeder lanes 20 that extend from a thoroughfare 22 on the left; feeder lanes 20 that extend in a direction of travel of the corresponding vehicle 12; feeder lanes 20 where both angles of departure 26*a*, 26*b* are less than or equal to ninety degrees; feeder lanes 20 where at least one angle of departure 26 is less than or equal to ninety degrees; feeder lanes 20 where both angles of departure 26*a*, 26*b* are greater than ninety degrees; feeder lanes 20 having only one angle of departure 26, which angle 26 is greater than ninety degrees; feeder lanes 20 where one angle of departure 26*a*, 26*b* is less than or equal to ninety degrees and the other 26*b*, 26*a* is greater than ninety degrees; feeder lanes 20 that have one or more of the configurations or various noted above; or the like or a combination or sub-combination thereof.

A fusion module 62 may enable a system 32 to perform sensor fusion. For example, a fusion module 62 may enable sensor fusion between vehicle detection (e.g., detection of the location and/or orientation of one or more parked vehicles 12 using one or more lidar devices, radar devices, ultrasonic devices, or the like or a combination or sub-combination thereof), line detection (e.g., detection of the location and/or orientation of one or more lines 16 using one or more cameras), and/or arrow detection (e.g., detection of the location and/or orientation of one or more arrows 24 using one or more cameras). Such sensor fusion may enable the resulting characterization of a parking lot 14 to have less uncertainty.

A control module 64 may be programmed to interpret selected sensor data 46, the information output by a computer-vision module 56, mapping module 58, and/or neural network module 60, or the like or a combination of sub-combination thereof. In certain embodiments, this may include weighing conflicting information and determining which information should be relied upon (e.g., weighed more heavily). For example, if the orientation of a significant number of parked vehicles 12 conflicts with information regarding the orientation of one or more lines 16, a control module 64 may choose to place more weight on (e.g., rely on) the orientation of the parked vehicles 12. Similarly, a control module 64 may choose to place more weight on more lines 16 over fewer lines 16, more parked vehicles 12 over fewer parked vehicles 12, or the like.

In selected embodiments, a control module 64 may request, initiate, or implement one or more actions or functions based on selected sensor data 46, the information output by a computer-vision module 56, mapping module 58, and/or neural network module 60, or the like or a combination of sub-combination thereof. For example, when a control module 64 determines from the data 46, other informational outputs, or the like that a vehicle 12 is approaching an entrance to a feeder lane 20, the control module 64 may request or initial a process wherein the corresponding vehicle 12 turns into that feeder lane 20. Conversely, when a control module 64 determines from the data 46, other informational outputs, or the like that a vehicle 12 is approaching an exit to a feeder lane 20, the control module 62 may request or initial a process wherein the corresponding vehicle 12 avoids that feeder lane 20 and goes on in search of another.

In certain embodiments, a control module 64 may maintain in memory 40 certain characteristics (e.g., orientations, angles of departure 26, appropriate directions of travel 28, or the like or combinations or sub-combinations thereof) corresponding to a parking space 10 in which the vehicle 12 parks. This may enable a control module 64 to use information gathered while entering a particular feeder lane 20 and/or a particular parking space 10 to assist in properly exiting the particular parking space 10 and/or the particular feeder lane 20.

Figure 7:
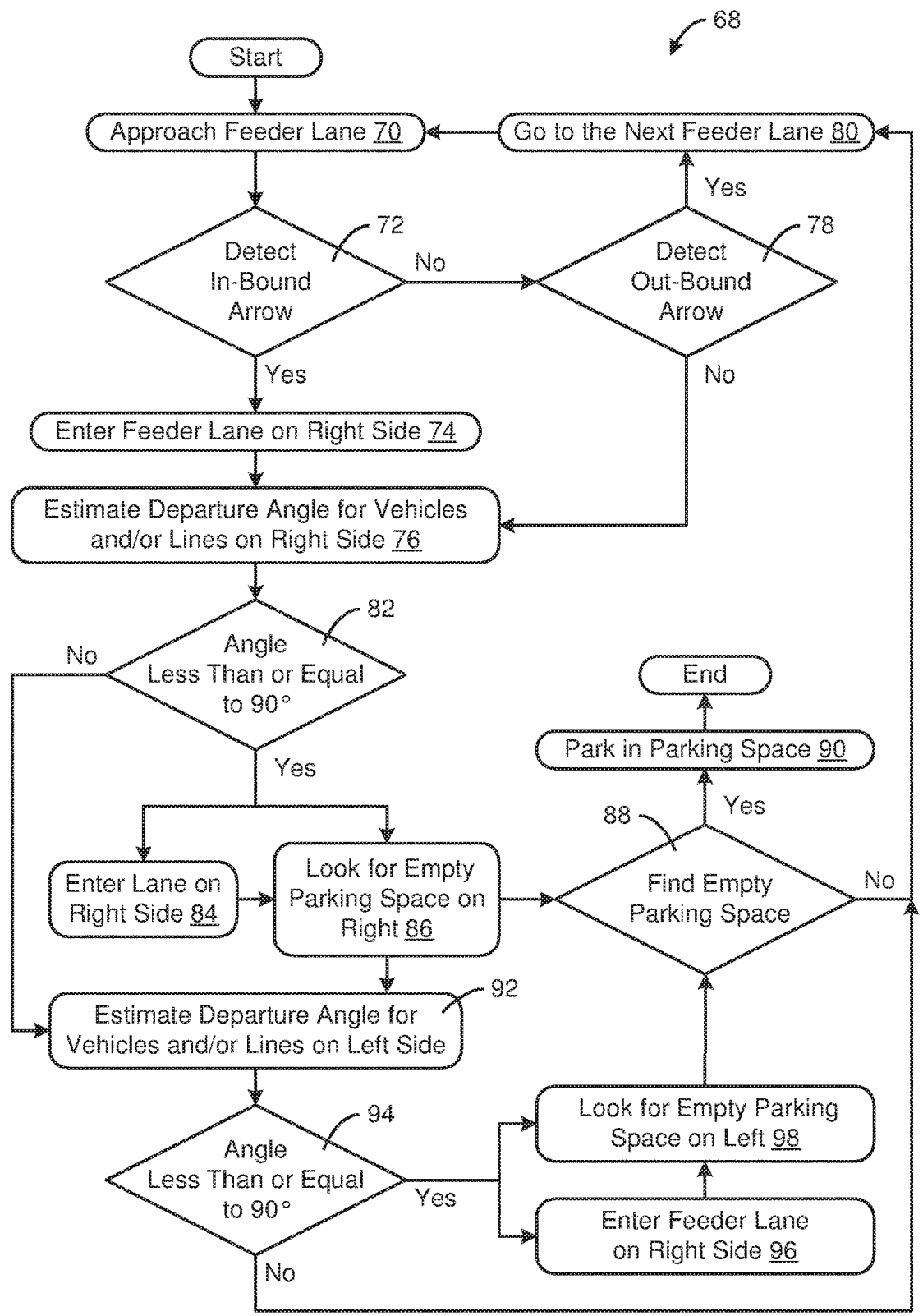
FIG. 7 is a schematic block diagram of one embodiment of a method for assisting a vehicle in navigating a parking lot in accordance with the present invention.

Referring to FIG. 7, in selected embodiments, a process 68 in accordance with the present invention may be different based on the conventions of the country wherein the process 68 is performed. For example, if a vehicle 12 is operating in a country where it is conventional to drive on the right side of the road, the vehicle 12 may enter a feeder lane 20 on the ride side. Conversely, if the vehicle 12 is operating in a country where it is conventional to drive on the left side of the road, the vehicle 12 may enter the feeder lane 20 on the left side thereof. Thus, while the process 68 is illustrated and discussed below in the context of a vehicle 12 driving on the right side of the road, it may be adapted to the opposite context simply by replacing "right" with "left" and "left" with "right."

In certain embodiments, a process 68 may begin when a vehicle 12 approaches 70 a feeder lane 20. A determination 72 may then be made as to whether an in-bound arrow 24*a* corresponding to the feeder lane 20 has been detected. If an in-bound arrow 24*a* is detected, it is an indication that the vehicle 12 has approached an entrance of the feeder lane 20. Accordingly, the vehicle 12 may enter 74 the feeder lane 20 on the right side thereof and estimate 76 an angle of departure 26 corresponding to one or more parked vehicles 12 and/or one or more lines 16 on a right side of the feeder lane 20.

Conversely, if no in-bound arrow 24*a* is detected 72, a determination 78 may be made as to whether an out-bound arrow 24*a* corresponding to the feeder lane 20 has been detected. If an out-bound arrow 24*b* is detected 78 (i.e., there is no in-bound arrow 24*a*, but there is an out-bound arrow 24*b*), it is an indication that the vehicle 12 has approached an exit of the feeder lane 20. Accordingly, the vehicle 12 may avoid that feeder lane 20 and go 80 on in search for another.

If an out-bound arrow 24*b* is not detected 78 (i.e., there is no in-bound arrow 24*a* and no out-bound arrow 24*b*), a vehicle 12 may need to consider other sources of information to know whether it should enter the feeder lane 20. Accordingly, the vehicle 12 may (e.g., from a location outside of the feeder lane 20) estimate 76 an angle of departure 26 corresponding to one or more parked vehicles 12 and/or one or more lines 16 on a right side of the feeder lane 20.

If the angle of departure 26 corresponding to one or more parked vehicles 12 and/or one or more lines 16 on a right side of the feeder lane 20 is found 82 to be less than or equal to ninety degrees, it may be an indication that it would be appropriate to park on that side. Accordingly, the vehicle 12 may enter 84 the feeder lane 20 on the right side thereof and look 86 for an empty parking space 10 on the right. Alternatively, if the vehicle 12 entered 74 the feeder lane 20 earlier, it may simply look 86 for an empty parking space 10 on the right. Additionally, the vehicle 12 may take steps to determine whether it would be appropriate to look for a parking space 10 on the left side as well. In any event, if a vehicle finds 88 an empty parking space 10 on a side where it is looking 86, it may park 90 in that space. If no empty parking space 10 is found 88, the vehicle 12 may go 80 on in search of another feeder lane 20, abandon the search for a parking space 10, or the like.

If the angle of departure 26 corresponding to one or more parked vehicles 12 and/or one or more lines 16 on a right side of the feeder lane 20 is found 82 to be greater than ninety degrees, it may be an indication that it would be inappropriate to park on that side. Accordingly, the vehicle 12 may (e.g., from a location outside or inside the feeder lane 20 depending on whether the vehicle 12 earlier entered 74 the feeder lane 20) estimate 92 an angle of departure 26 corresponding to one or more parked vehicles 12 and/or one or more lines 16 on a left side of the feeder lane 20.

If the angle of departure 26 corresponding to one or more parked vehicles 12 and/or one or more lines 16 on a left side of the feeder lane 20 is found 94 to be less than or equal to ninety degrees, it may be an indication that it would be appropriate to park on that side. Accordingly, the vehicle 12 may enter 96 the feeder lane 20 on the right side thereof and look 98 for an empty parking space 10 on the left. Alternatively, if the vehicle 12 entered 74, 84 the feeder lane 20 earlier, it may simply look 98 for an empty parking space 10 on the left. If the vehicle finds 88 an empty parking space 10 on a side where it is looking 86, it may park 90 in that space.

Conversely, if the angle of departure 26 corresponding to one or more parked vehicles 12 and/or one or more lines 16 on a left side of the feeder lane 20 is found 94 to be greater than ninety degrees (i.e., the angle of departure 26a on the right and the angle of departure 26b on the left are both greater than ninety degrees), it may be an indication that the vehicle 12 has approached an exit of a one-way feeder lane 20. Accordingly, the vehicle 12 may avoid that feeder lane 20 and go 80 on in search for another.

In selected embodiments, detecting 72, 78, estimating 76, 92, and looking 86, 98 in accordance with the present invention may be accomplished using computer-vision techniques, three-dimensional mapping, classification by an artificial neural network, or the like or a combination or sub-combination thereof.

The flowchart in FIG. 7 illustrates the architecture, functionality, and operation of possible implementations of systems, methods, and computer-program products according to various embodiments in accordance with the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. For example, in the illustrated embodiment, the process for determining whether it would be appropriate to park on the right precedes the process for determining whether it would be appropriate to park on the left. In certain embodiments, these two processes may occur substantially simultaneously or in reverse order.

Alternatively, or in addition thereto, certain steps or functions may be omitted if not needed. For example, in the illustrated embodiment, the process for detecting arrows 24 precedes the process for analyzing the orientation of parked vehicles 12 and/or lines 16. In certain embodiments, the process for detecting arrows 24 may be omitted and the determination of whether to enter a feeder lane 20 may be based solely on the orientation of parked vehicles 12 and/or lines 16 corresponding thereto.

Figure 8:
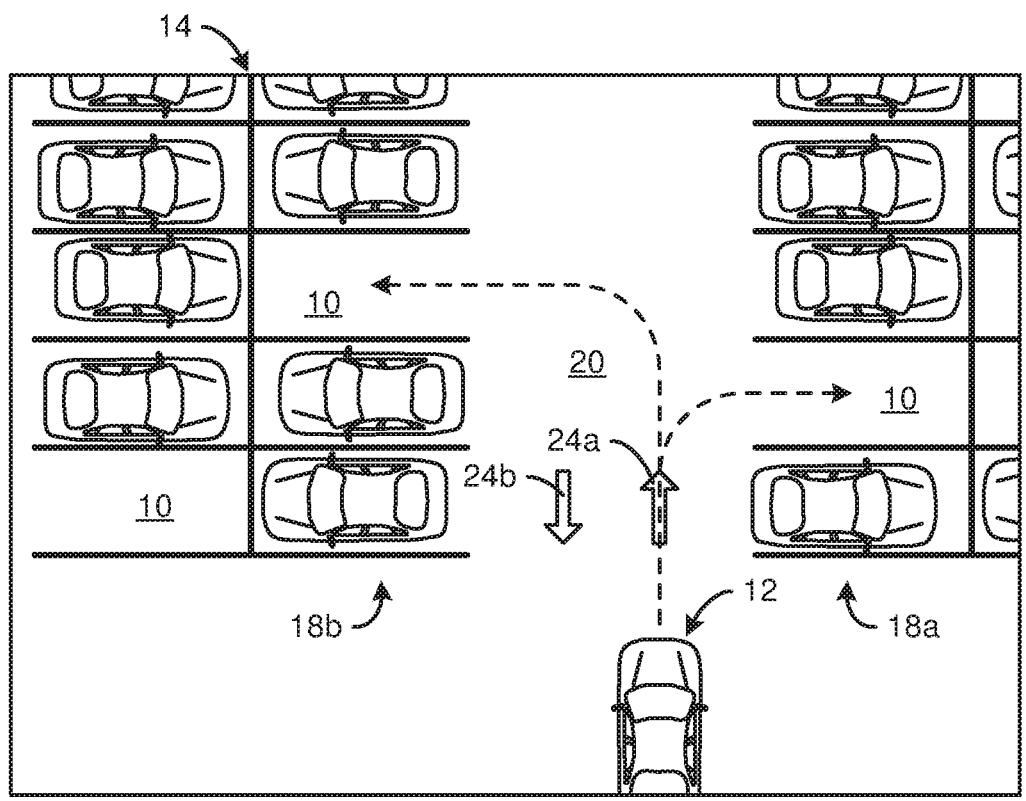
FIG. 8 is a schematic diagram illustrating a top view of a portion of a parking lot arranged in a first exemplary situation or configuration.

Referring to FIG. 8, a first exemplary situation is illustrated wherein a vehicle 12 has approached 70 a feeder lane 20 that extends in a direction of travel of the vehicle 12. The feeder lane 20 is bounded on the right and the left by respective rows 18a, 18b of parking spaces 10 that are orthogonal to the feeder lane 20 (e.g., have an angle of departure 26 that is about ninety degrees). The feeder lane 20 includes at an end thereof both an in-bound arrow 24a and an out-bound arrow 24b.

Accordingly, when the vehicle 12 (e.g., a system 32 within the vehicle 12) applies a process 68 in accordance with the present invention to the first exemplary situation, the vehicle 12 may detect 72 an in-bound arrow 24a and enter 74 the feeder lane 20 on the right side. The vehicle 12 may further estimate 76, 92 the angles of departure 26 on the right and left and find 82, 94 that they are both less than or equal to ninety degrees. Accordingly, the vehicle 12 may look 86, 98 for an empty parking space 10 on both the left and the right.

Figure 9:
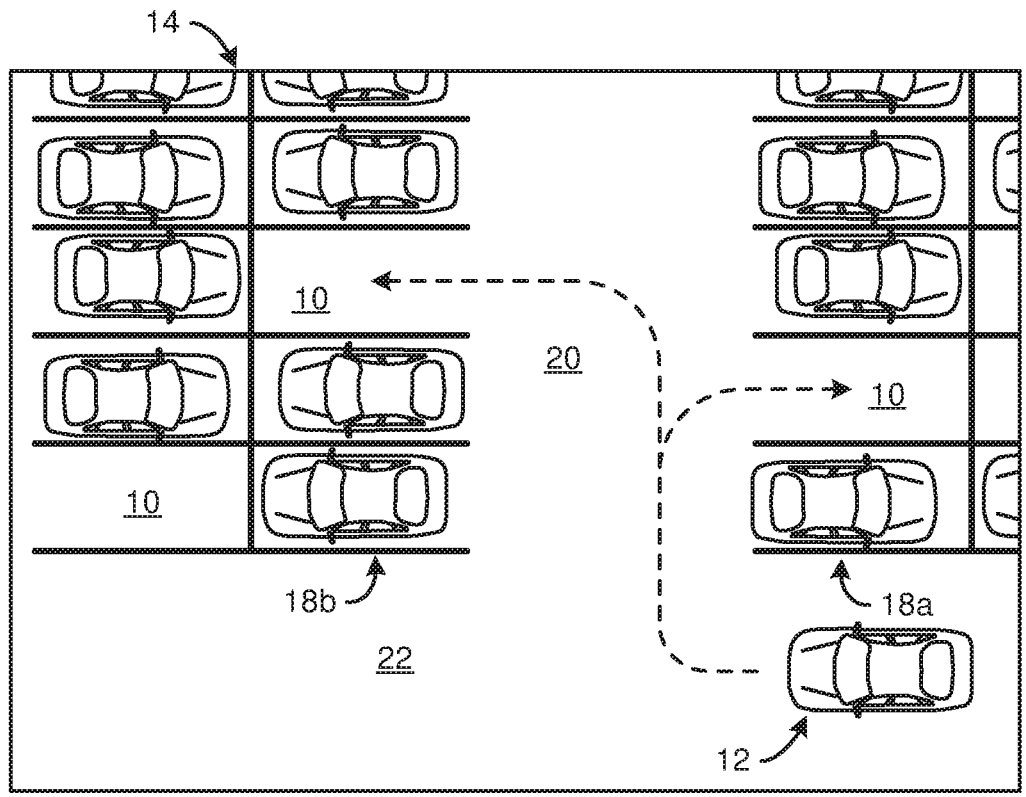
FIG. 9 is a schematic diagram illustrating a top view of a portion of a parking lot arranged in a second exemplary situation or configuration.

Referring to FIG. 9, a second exemplary situation is illustrated wherein a vehicle 12 is on a thoroughfare 22 and has approached 70 a feeder lane 20 that extends from the right of the thoroughfare 22. The feeder lane 20 is bounded on the right and the left by respective rows 18a, 18b of parking spaces 10 that are orthogonal to the feeder lane 20 (e.g., have an angle of departure 26 that is about ninety degrees). The feeder lane 20 does not include any in-bound arrow 24a or out-bound arrow 24b.

Accordingly, when the vehicle 12 (e.g., a system 32 within the vehicle 12) applies a process 68 in accordance with the present invention to the second exemplary situation, the vehicle 12 may detect 72 no arrows. Thus, before entering the feeder lane 20, the vehicle 12 may estimate 76, 92 the angles of departure 26 on the right and left and find 82, 94 that they are both less than or equal to ninety degrees. Accordingly, the vehicle 12 may enter 84 the feeder lane 20 and look 86, 98 for an empty parking space 10 on both the left and the right.

Figure 10:
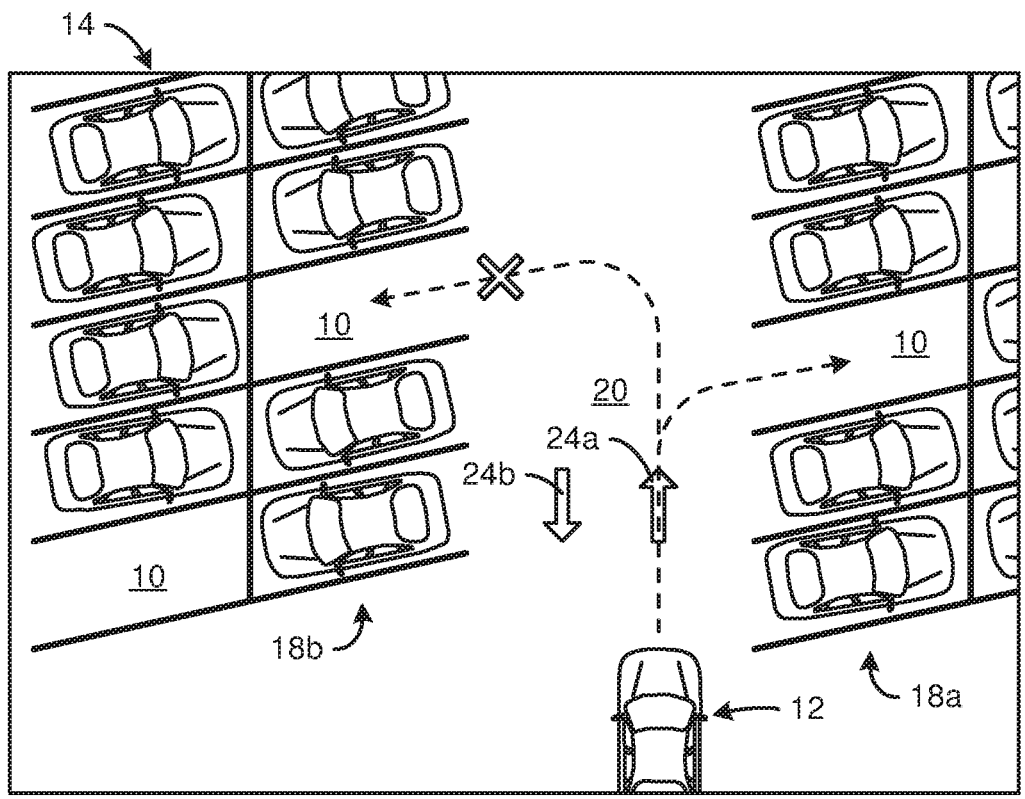
FIG. 10 is a schematic diagram illustrating a top view of a portion of a parking lot arranged in a third exemplary situation or configuration.

Referring to FIG. 10, a third exemplary situation is illustrated wherein a vehicle 12 has approached 70 a feeder lane 20 that extends in a direction of travel of the vehicle 12. The feeder lane 20 is bounded on the right and the left by respective rows 18a, 18b of parking spaces 10. The row 18a on the right corresponds to an angle of departure 26a that is less than ninety degrees. The row 18b on the left corresponds to an angle of departure 26b that is greater than ninety degrees. The feeder lane 20 includes at an end thereof both an in-bound arrow 24a and an out-bound arrow 24b.

Accordingly, when the vehicle 12 (e.g., a system 32 within the vehicle 12) applies a process 68 in accordance with the present invention to the third exemplary situation, the vehicle 12 may detect 72 an in-bound arrow 24a and enter 74 the feeder lane 20 on the right side. The vehicle 12 may further estimate 76, 92 the angles of departure 26 on the right and left and find 82, 94 that the former is less than ninety degrees and the latter is greater than ninety degrees. Accordingly, the vehicle 12 may look 86, 98 for an empty parking space 10 on the right only.

Figure 11:
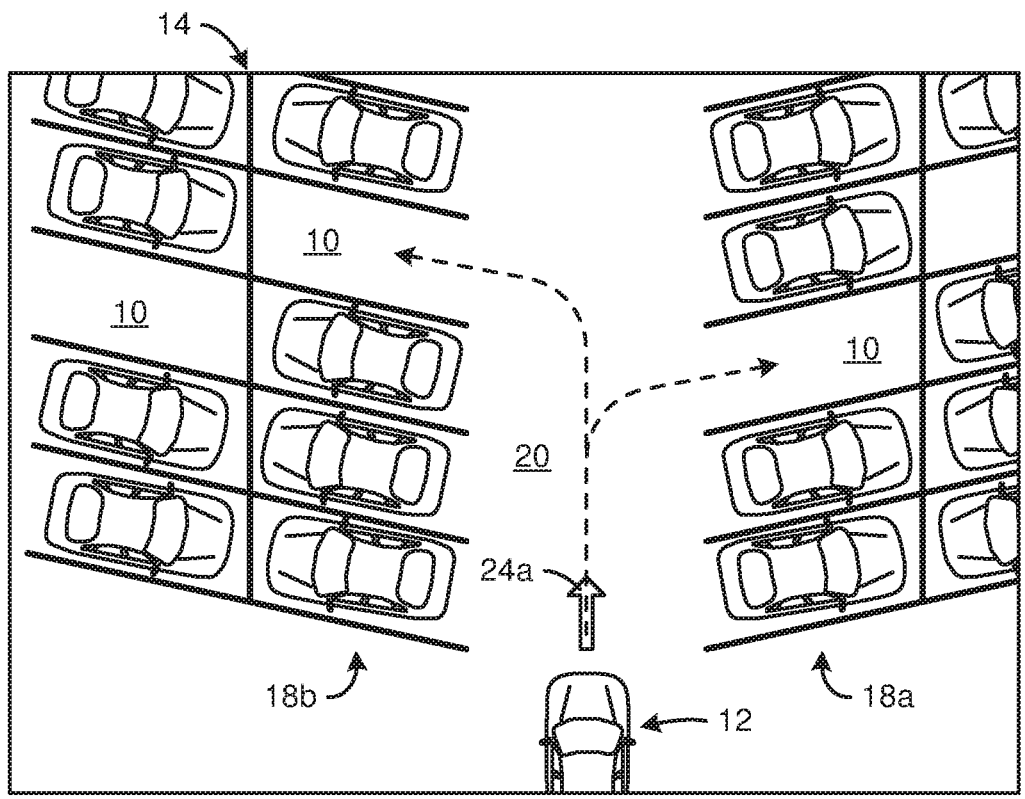
FIG. 11 is a schematic diagram illustrating a top view of a portion of a parking lot arranged in a forth exemplary situation or configuration.

Referring to FIG. 11, a fourth exemplary situation is illustrated wherein a vehicle 12 has approached 70 a feeder lane 20 that extends in a direction of travel of the vehicle 12. The feeder lane 20 is bounded on the right and the left by respective rows 18a, 18b of parking spaces 10 that both have an angle of departure 26 that is less than ninety degrees. The feeder lane 20 includes at an end thereof only an in-bound arrow 24a.

Accordingly, when the vehicle 12 (e.g., a system 32 within the vehicle 12) applies a process 68 in accordance with the present invention to the forth exemplary situation, the vehicle 12 may detect 72 an in-bound arrow 24a and enter 74 the feeder lane 20 on the right side. The vehicle 12 may further estimate 76, 92 the angles of departure 26 on the right and left and find 82, 94 that the both are less than ninety degrees. Accordingly, the vehicle 12 may look 86, 98 for an empty parking space 10 on both the right and the left.

Figure 12:
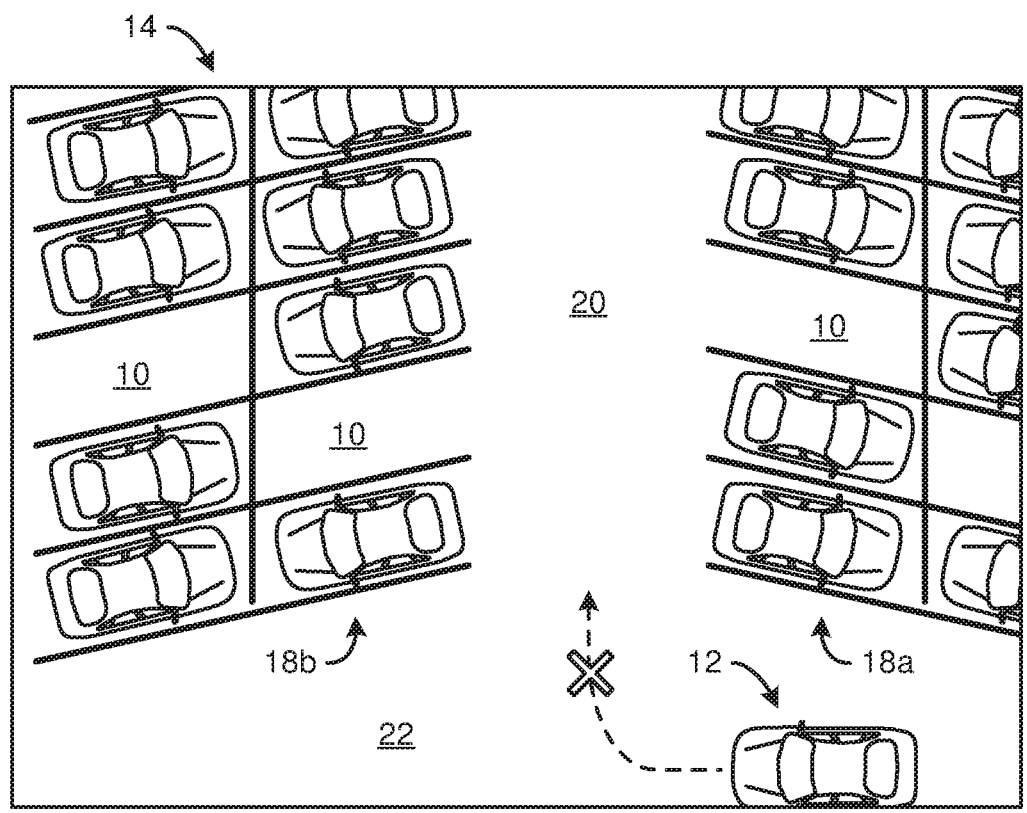
FIG. 12 is a schematic diagram illustrating a top view of a portion of a parking lot arranged in a fifth exemplary situation or configuration.

Referring to FIG. 12, a fifth exemplary situation is illustrated wherein a vehicle 12 is on a thoroughfare 22 and has approached 70 a feeder lane 20 that extends from the right of the thoroughfare 22. The feeder lane 20 is bounded on the right and the left by respective rows 18a, 18b of parking spaces 10 that both have an angle of departure 26 that is greater than ninety degrees. The feeder lane 20 does not include any in-bound arrow 24a or out-bound arrow 24b.

Accordingly, when the vehicle 12 (e.g., a system 32 within the vehicle 12) applies a process 68 in accordance with the present invention to the fifth exemplary situation, the vehicle 12 may detect 72 no arrows. Thus, before entering the feeder lane 20, the vehicle 12 may estimate 76, 92 the angles of departure 26 on the right and left and find 82, 94 that both are greater than ninety degrees. Accordingly, the vehicle 12 may avoid the feeder lane 20 and go 80 on in search of another.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for determining whether to advance into a feeder lane within a parking lot, the method comprising:
    approaching, by an autonomous vehicle, the feeder lane within the parking lot;
    identifying, by the autonomous vehicle, using at least one of machine learning and computer vision, at least one of
        an in-bound arrow on the feeder lane, and
        parking lines or a parked vehicle adjacent the feeder lane defining a departure angle less than or equal to ninety degrees, wherein the angle of departure is a measure of a change of direction necessary for the autonomous vehicle to appropriately enter one or more parking spaces directly adjacent the feeder lane if the autonomous vehicle were already traveling down the feeder lane; and
    advancing, by the autonomous vehicle in response to the identifying, into the feeder lane.

2. The method of claim 1, further comprising using one or more sensors on-board the autonomous vehicle to collect data characterizing at least a portion of the feeder lane.

3. The method of claim 2, wherein the identifying comprises applying, by a computer system carried on-board the autonomous vehicle, the at least one of machine learning and computer vision to the data.

4. The method of claim 3, wherein the one or more sensors comprise a camera.

5. The method of claim 4, wherein the data comprises at least one image frame output by the camera.

6. The method of claim 5, wherein the identifying further comprises using, by the computer system, computer vision to select at least one region of interest comprising less than all of the at least one image frame.

7. The method of claim 6, wherein the identifying further comprises generating, by the computer system, at least one cropped subset of the at least one image frame by cropping the at least one region of interest from the at least one image frame.

8. The method of claim 7, wherein the identifying further comprises using, by the computer system, an artificial neural network to classify the at least one cropped subset.

9. The method of claim 8, wherein:
    the identifying further comprises using, by the computer system, the artificial neural network to determine an affinity score between the at least one cropped subset and each class of a plurality of classes; and
    the plurality of classes includes
        a no arrow class,
        an in-bound arrow only class,
        an out-bound arrow only class, and
        an in-bound and out-bound arrow class.

10. The method of claim 8, wherein:
    the identifying further comprises using, by the computer system, the artificial neural network to determine an affinity score between the at least one cropped subset and each class of a plurality of classes; and
    the plurality of classes includes
        a no parking lines class,
        a parking lines with departure angle of less than or equal to ninety degrees class, and
        a parking lines with departure angle of greater than ninety degrees class.

11. The method of claim 8, wherein:
    the identifying further comprises using, by the computer system, the artificial neural network to determine an affinity score between the at least one cropped subset and each class of a plurality of classes; and
    the plurality of classes includes
        a no parked vehicle class,
        a parked vehicle with departure angle of less than or equal to ninety degrees class, and
        a parked vehicle with departure angle of greater than ninety degrees class.

12. A method for determining whether to advance into a first feeder lane within a parking lot, the method comprising:
    approaching, by an autonomous vehicle, the first feeder lane within the parking lot;
    collecting, by one or more sensors on-board the autonomous vehicle, first data characterizing at least a portion of the first feeder lane;
    confirming, by a computer system carried on-board the autonomous vehicle, an existence of a condition precedent for advancing into the first feeder lane;
    the confirming comprising detecting the condition precedent by at least one of applying a machine-learning algorithm to the first data, applying a computer-vision technique to the first data, and extracting first range measurements from the first data;
    the confirming wherein the condition precedent for advancing into the first feeder lane comprises at least one of
        an in-bound arrow on the first feeder lane, parking lines adjacent the first feeder lane defining a departure angle less than or equal to ninety degrees, wherein the angle of departure defined by the parking lines adjacent the first feeder lane is a measure of a change of direction necessary for the autonomous vehicle to appropriately enter a parking space defined by the parking lines adjacent the first feeder lane if the autonomous vehicle were already traveling down the first feeder lane, and at least one parked vehicle adjacent the first feeder lane defining a departure angle less than or equal to ninety degrees, wherein the angle of departure defined by the at least one parked vehicle adjacent the first feeder lane is a measure of a change of direction necessary for the autonomous vehicle to turn and park alongside the at least one parked vehicle adjacent the first feeder lane if the autonomous vehicle were already traveling down the first feeder lane; and advancing, by the autonomous vehicle, into the first feeder lane in response to the confirming.

13. The method of claim 12, further comprising approaching, by the autonomous vehicle, a second feeder lane within the parking lot.

14. The method of claim 13, further comprising collecting, by the one or more sensors, second data characterizing at least a portion of the second feeder lane.

15. The method of claim 14, further comprising confirming, by the computer system carried on-board the autonomous vehicle, an absence of a condition precedent for advancing into the second feeder lane.

16. The method of claim 15, wherein the confirming the absence comprises at least one of applying the machine-learning algorithm to the second data, applying the computer-vision technique to the second data, and extracting second range measurements from the second data.

17. The method of claim 16, wherein the condition precedent for advancing into the second feeder lane comprises at least one of:

an in-bound arrow on the second feeder lane;

parking lines adjacent the second feeder lane defining a departure angle less than or equal to ninety degrees, wherein the angle of departure defined by the parking lines adjacent the second feeder lane is a measure of a change of direction necessary for the autonomous vehicle to appropriately enter a parking space defined by the parking lines adjacent the second feeder lane if the autonomous vehicle were already traveling down the second feeder lane; and at least one parked vehicle adjacent the second feeder lane defining a departure angle less than or equal to ninety degrees, wherein the angle of departure defined by the at least one parked vehicle adjacent the second feeder lane is a measure of a change of direction necessary for the autonomous vehicle to turn and park alongside the at least one parked vehicle adjacent the second feeder lane if the autonomous vehicle were already traveling down the second feeder lane.

18. The method of claim 17, further comprising avoiding, by the autonomous vehicle, the second feeder lane in response to the confirming the absence.

19. The method of claim 12, wherein:
the one or more sensors comprise a camera;
the data comprises at least one image frame output by the camera;
the identifying further comprises using, by the computer system, computer vision to select at least one region of interest comprising less than all of the at least one image frame;
the identifying further comprises generating, by the computer system, at least one cropped subset of the at least one image frame by cropping the at least one region of interest from the at least one image frame; and
the identifying further comprises using, by the computer system, an artificial neural network to classify the at least one cropped subset.

20. An autonomous vehicle comprising:
one or more sensors carried on-board the autonomous vehicle;
at least one processor carried on-board the autonomous vehicle; and
memory operably connected to the at least one processor, the memory storing software programmed to
direct the autonomous vehicle to a first feeder lane within a parking lot,
collect data output by the one or more sensors that characterizes at least a portion of the first feeder lane,
use at least one of machine learning, computer vision, and range measurement to determine whether a condition precedent for entering the first feeder lane is reflected in the data, wherein the condition precedent comprises a presence of at least one of
an in-bound arrow on the first feeder lane,
parking lines adjacent the first feeder lane defining a departure angle less than or equal to ninety degrees, wherein the angle of departure defined by the parking lines is a measure of a change of direction necessary for the autonomous vehicle to appropriately enter a parking space defined by the parking lines if the autonomous vehicle were already traveling down the first feeder lane, and
at least one parked vehicle adjacent the first feeder lane defining a departure angle less than or equal to ninety degrees, wherein the angle of departure defined by the at least one parked vehicle is a measure of a change of direction necessary for the autonomous vehicle to turn and park alongside the at least one parked vehicle if the autonomous vehicle were already traveling down the first feeder lane,
direct the autonomous vehicle to enter the first feeder lane when the condition precedent is present, and
direct the autonomous vehicle to a second feeder lane when the condition precedent is not present.

* * * * *